(12) United States Patent
Titus et al.

(10) Patent No.: US 11,548,498 B2
(45) Date of Patent: Jan. 10, 2023

(54) SYSTEM AND METHOD FOR ACTIVE AERODYNAMIC DEVICE CONTROL FOR A VEHICLE

(71) Applicant: Ford Global Technologies, LLC, Dearborn, MI (US)

(72) Inventors: Matthew Titus, Livonia, MI (US); Steven Thompson, Royal Oak, MI (US); Michael Sylvester, Berkley, MI (US); Rick Dempsey, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 16/792,538

(22) Filed: Feb. 17, 2020

(65) Prior Publication Data

US 2021/0253087 A1 Aug. 19, 2021

(51) Int. Cl.
*B60W 30/02* (2012.01)
*B60W 40/08* (2012.01)

(52) U.S. Cl.
CPC ............ *B60W 30/02* (2013.01); *B60W 40/08* (2013.01); *B60W 2510/18* (2013.01)

(58) Field of Classification Search
CPC ... B60W 30/02; B60W 40/08; B60W 2510/18
See application file for complete search history.

(56) References Cited

U.S. PATENT DOCUMENTS

| 4,810,022 A | 3/1989 | Takagi et al. |
| 9,849,924 B2 | 12/2017 | Shami |
| 10,035,548 B2 | 7/2018 | Barber |

(Continued)

FOREIGN PATENT DOCUMENTS

| CN | 207579981 U | * | 7/2018 |
| DE | 10211114767 A1 | | 4/2013 |

(Continued)

OTHER PUBLICATIONS

Mohammed Hammad, Design and Analysis of Active Aerodynamic Control Systems for Increasing the Safety of High-Speed Road Vehicles, Jul. 2019 (Year: 2019).*

(Continued)

*Primary Examiner* — Dale W Hilgendorf
*Assistant Examiner* — Hana Lee
(74) *Attorney, Agent, or Firm* — Burr & Forman LLP; Lorne Forsythe

(57) ABSTRACT

A dynamic vehicle stability control system for a vehicle may include an active wing extending laterally relative to a longitudinal centerline of the vehicle and configured to be rotatable to change an angle of attack relative to wind passing over the vehicle parallel to the longitudinal centerline, a repositioning assembly operably coupling the active wing to the vehicle, and a controller operably coupled to components and/or a sensor network of the vehicle to receive status information about the vehicle. The repositioning assembly may be operated based on a wing angle command received by the controller responsive to execution of a plurality of control algorithms executed by the controller. The controller may be configured to determine the wing angle command based on respective wing angle requests generated by each of the control algorithms.

14 Claims, 9 Drawing Sheets

(56) References Cited

U.S. PATENT DOCUMENTS

| | | | | |
|---|---|---|---|---|
| 2013/0226414 A1* | 8/2013 | De Luca | ................ | B62D 37/02 |
| | | | | 701/49 |
| 2017/0088194 A1* | 3/2017 | Heil | ........................ | B62D 35/02 |
| 2018/0050741 A1* | 2/2018 | Wolf | ...................... | B62D 37/02 |

FOREIGN PATENT DOCUMENTS

| | | |
|---|---|---|
| JP | 2006282056 A | 10/2006 |
| WO | 2010030158 A1 | 3/2010 |

OTHER PUBLICATIONS

James P. Merkel, Development of Multi-Element Active Aerodynamics for the Formula SAE Car, Dec. 2013 (Year: 2013).*

TRP, How F1 Works: Drag Reduction System (DRS), Aug. 28, 2012, Sportskeeda (Year: 2012).*

Bruce Martin, IndyCar Engineers Talk About Wing Angles and Downforce, Jun. 9, 2018, Autoweek (Year: 2018).*

Dennis Simanaitis, F1 DRS: Less Drag = More Passing, Feb. 1, 2012, Road & Track (Year: 2012).*

Frankie F. Jackson, Aerodynamic Optimisation of Formula SAE Vehicle Using Computational Fluid Dynamics, Feb. 21, 2018 (Year: 2018).*

Balakrishnan et al., Design of a Front Aerodynamic Package, Dec. 5, 2011 (Year: 2011).*

Tarulescu et al., Downforce Variation Dependence of Angle of Incidence Modification for Rear Wing of High Speed Vehicles, 2017 (Year: 2017).*

Shinji Kajiwara, Passive Variable Rear-Wing Aerodynamics of an Open-Wheel Racing Car, Aug. 31, 2017 (Year: 2017).*

Proceedings of the ASME 2012 International Design Engineering Technical Conferences & Computers and Information in Engineering Conference, IDETC/CIE 2012 held Aug. 12-15, 2012 in Chicago, IL, USA, titled "Active Aerodynamic System to Improve the Safety and Handling of Race Cars in Lane Change and Wet Road Maneuvers", written by Fereydoon Diba, Ahmad Barari, and Ebrahim Esmailzadeh.

* cited by examiner

SYSTEM AND METHOD FOR ACTIVE AERODYNAMIC DEVICE CONTROL FOR A VEHICLE

TECHNICAL FIELD

Example embodiments generally relate to vehicle aerodynamics and, more particularly, relate to a system and method for actively controlling aerodynamic devices of a vehicle for maximum capability and driver confidence.

BACKGROUND

Vehicles, and especially high performance vehicles, often employ aerodynamic devices that are designed to improve aerodynamic performance. These aerodynamic devices are typically static. Because these aerodynamic devices are static, they may provide improved performance over only a limited set of vehicle conditions. Outside of the limited set of vehicle conditions, the aerodynamic devices may compromise performance. As such, these static aerodynamic devices may be designed to be acceptable over all vehicle conditions at a single setting, and may therefore compromise vehicle performance relative to driver preferences and vehicle capabilities.

Thus, it may be desirable to develop an aerodynamic device that addresses some of the shortcomings discussed above.

BRIEF SUMMARY OF SOME EXAMPLES

In accordance with an example embodiment, a dynamic vehicle stability control system for a vehicle may be provided. The system may include an active wing extending laterally relative to a longitudinal centerline of the vehicle and configured to be rotatable to change an angle of attack relative to wind passing over the vehicle parallel to the longitudinal centerline, a repositioning assembly operably coupling the active wing to the vehicle, and a controller operably coupled to components and/or a sensor network of the vehicle to receive status information about the vehicle. The repositioning assembly may be operated based on a wing angle command received by the controller responsive to execution of a plurality of control algorithms executed by the controller. The controller may be configured to determine the wing angle command based on respective wing angle requests generated by each of the control algorithms.

In another example embodiment, a method of providing vehicle stability control to a vehicle having an active wing disposed on the vehicle may be provided. The method may include receiving status information from components and/or a sensor network of the vehicle, executing a plurality of control algorithms in parallel to determine a corresponding plurality of wing angle requests, prioritizing the wing angle requests based on vehicle status to select a wing angle command, and directing adjustment of the active wing based on the wing angle command.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8:
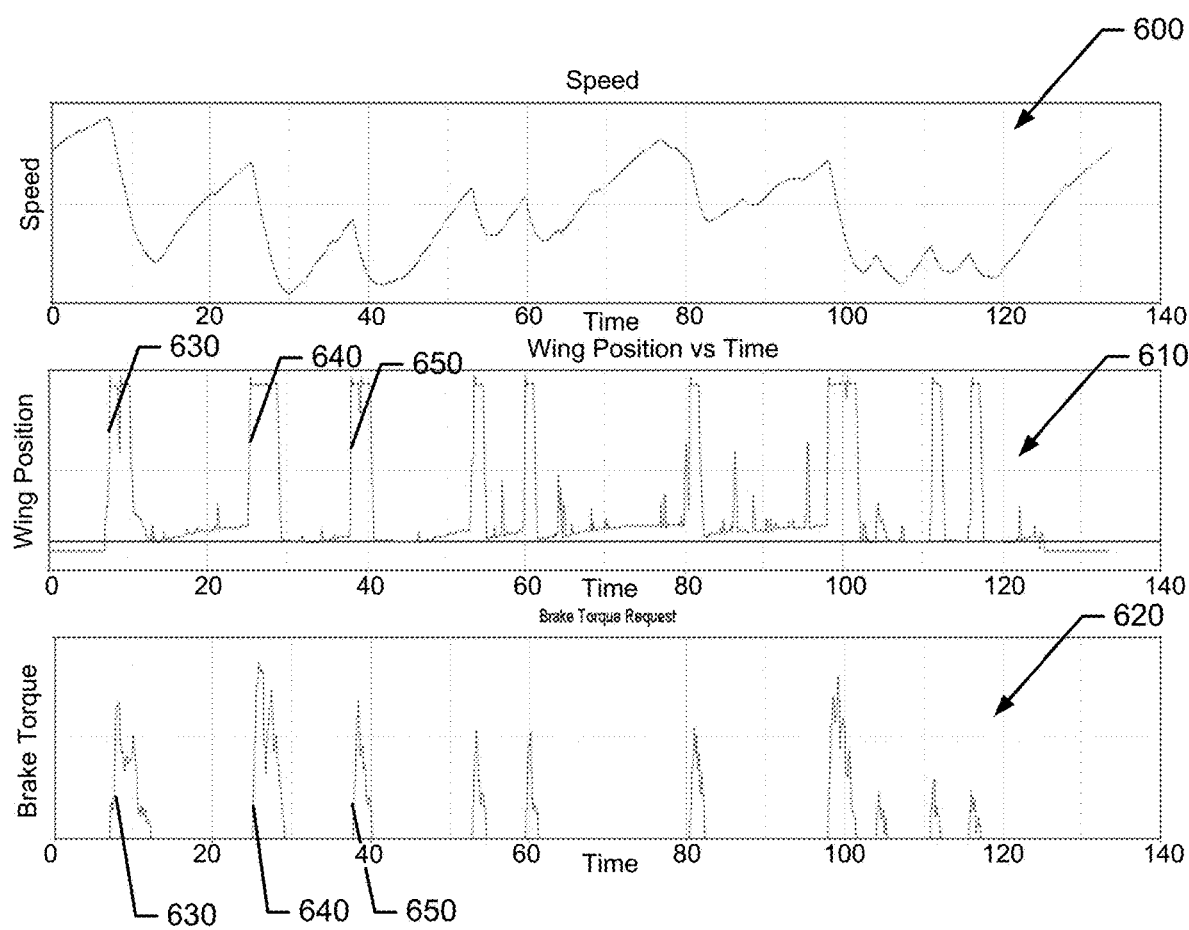
Figure 9:
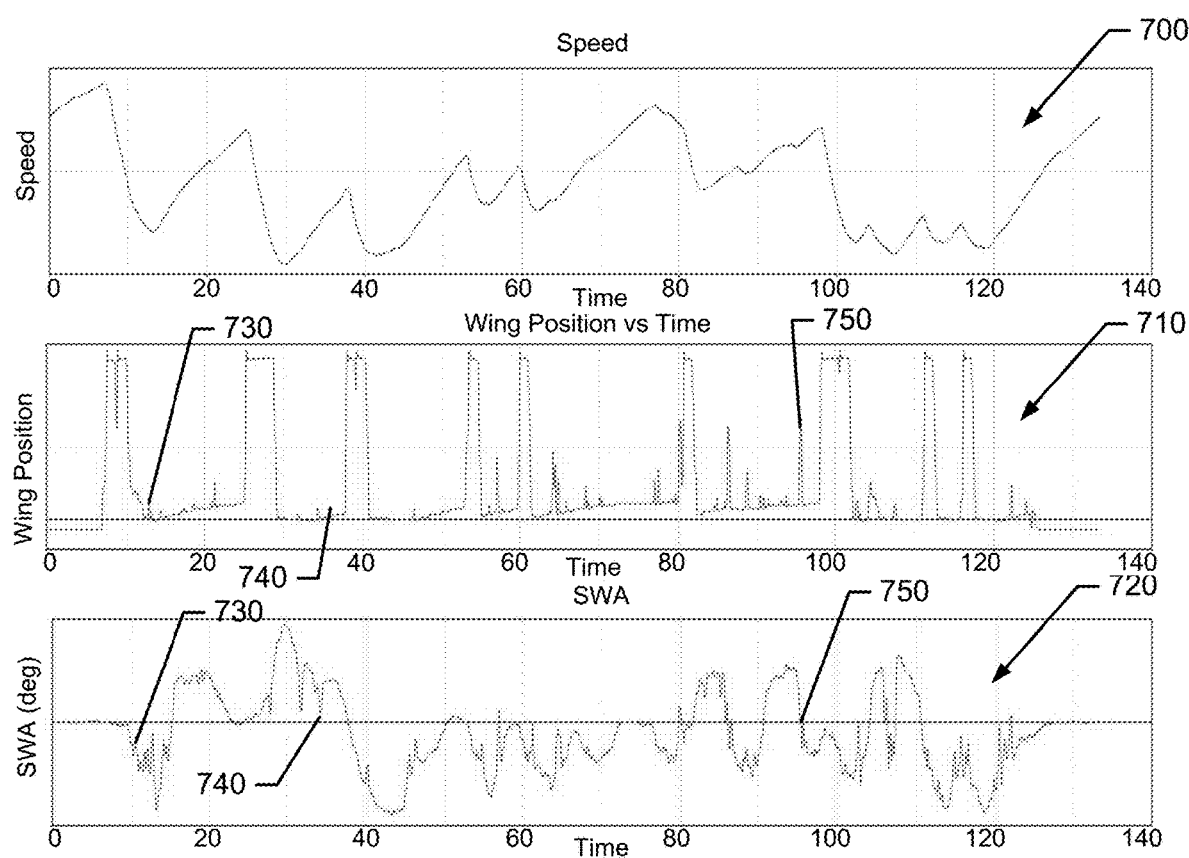

FIG. 8 shows graphs of vehicle speed verses time, wing position versus time, and requested brake torque versus time to illustrate operation of a wing deceleration algorithm in accordance with an example embodiment; and FIG. 9 shows graphs of vehicle speed verses time, wing position versus time, and steering wheel angle versus time to illustrate operation of a wing yaw algorithm in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some example embodiments may provide an improved system for aerodynamic control that includes an aerodynamic device (or element) that is capable of being tailored to various specific vehicle states, and can yield benefits in both customer confidence and vehicle capability with less compromise. As a result, vehicle performance and driver satisfaction may also be improved.

Figure 1:
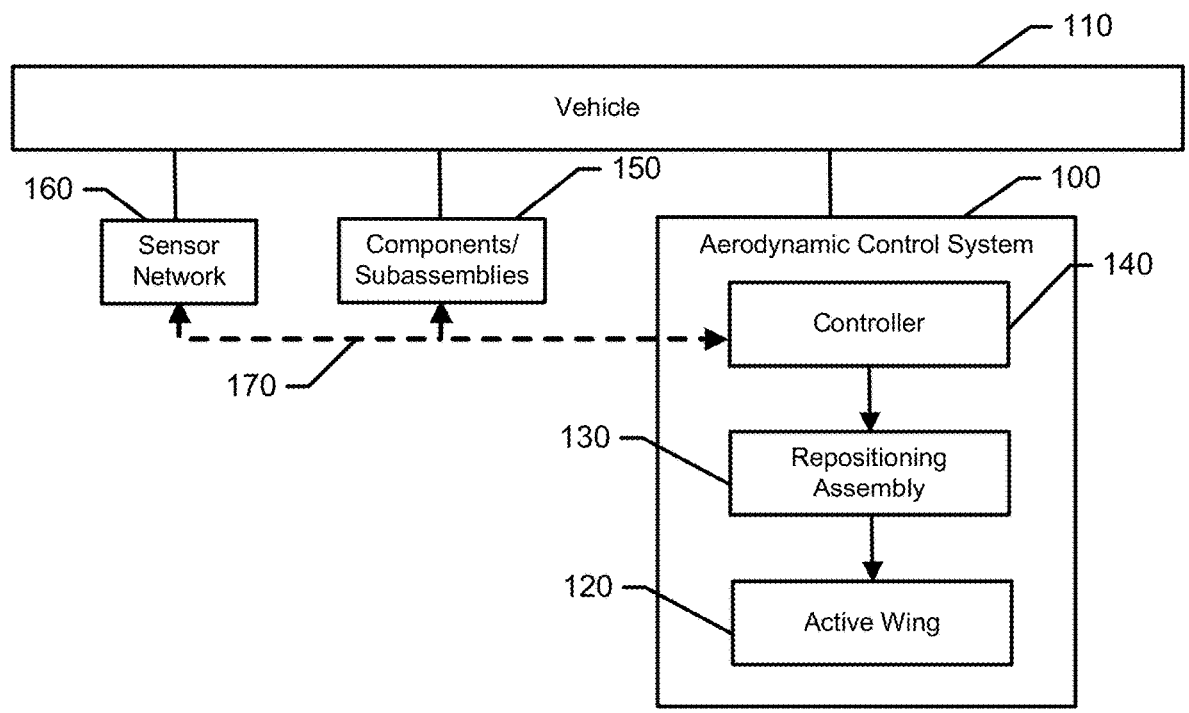
FIG. 1 illustrates a block diagram of a vehicle control system in accordance with an example embodiment.

FIG. 1 illustrates a block diagram of an aerodynamic control system 100 of an example embodiment. The components of the aerodynamic control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the aerodynamic control system 100 may be connected to the vehicle 110 via intermediate connections to other components either of the chassis or of other systems or components.

The aerodynamic control system 100 may include an aerodynamic device in the form of an active wing 120. The active wing 120 may be configured to be movable as described herein in order to change the angle of attack of the active wing 120 (also referred to simply as "wing angle") based on various conditions or information pertaining to vehicle status. Thus the "active" nature of the active wing 120 refers to the fact that it is enabled to be dynamically repositioned responsive to real time conditions and status information to actively improve stability of the vehicle 110. A repositioning assembly 130 may be provided as part of the aerodynamic control system 100 in order to move the active wing 120 under the control of a controller 140 (or control module) of the aerodynamic control system 100. In some cases, the controller 140 may be part of a vehicle dynamic module (VDM) or other control system of the vehicle 110 that is configured to perform other tasks related or not related to aerodynamic control or performance management. However, the controller 140 could be a dedicated or stand-alone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly and/or a wheel assembly of the vehicle 110. The brake assembly may provide inputs such as brake pedal position to the controller 140. Moreover, one or more corresponding sensors of the sensor network 160 that may be operably coupled to the brake assembly and/or the wheel assembly may provide information relating to brake torque, brake torque rate, vehicle velocity, vehicle acceleration, front/rear wheel speeds, etc. Other examples of the components or subassemblies 150 and/or corresponding sensors of the sensor network 160 may provide information relating to yaw, lateral G force, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may then be configured to use the information received in association with the execution of one or more control algorithms that may be used to provide instructions to the repositioning assembly 130 in order to control a position of the active wing 120.

Figure 2:
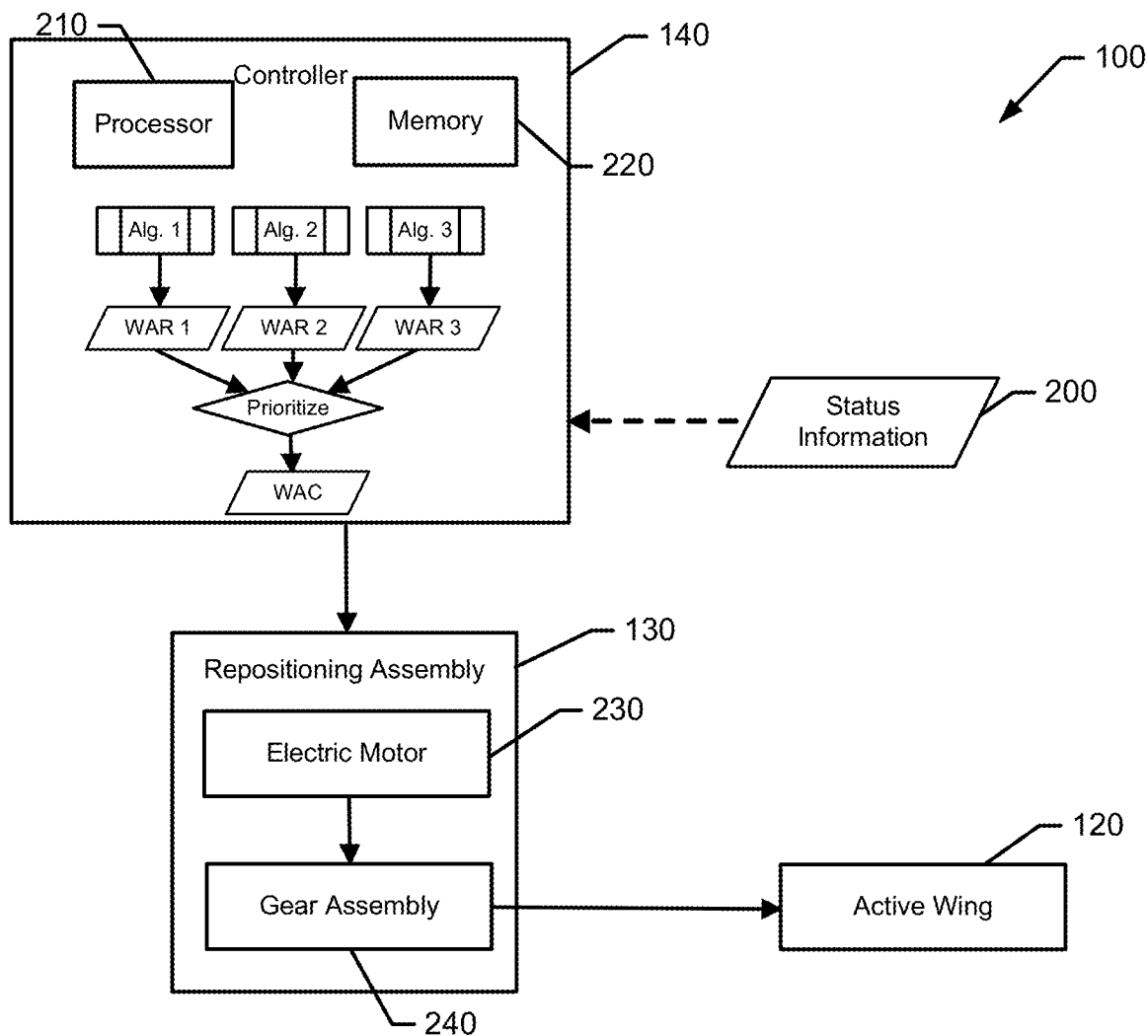
FIG. 2 illustrates a block diagram of some components of an aerodynamic control system of the vehicle control system of FIG. 1 in accordance with an example embodiment.

FIG. 2 illustrates a block diagram of various components of the aerodynamic control system 100 in greater detail. In this regard, for example, the controller 140 may receive status information 200 (e.g., from the sensor network 160) via the vehicle communication bus 170. The status information 200 may include any or all of the types of information described above. Processing circuitry (e.g., a processor 210 and memory 220) at the controller 140 may process the status information 200 by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the status information 200.

The processor 210 may be configured to execute the control algorithms in series or in parallel. However, in an example embodiment, the processor 210 may be configured to execute multiple control algorithms in parallel (e.g., simultaneously) and employ a priority schedule to determine which control algorithm has priority when there is a conflict between the instructions generated by more than one control algorithm. For example, each control algorithm (e.g., Alg. 1, Alg. 2, and Alg 3 in FIG. 2) may be executed in parallel to determine a corresponding wing angle request (e.g., WAR 1, WAR 2, and WAR 3). The wing angle requests may be considered with respect to a corresponding priority prescribed to each, which may either be fixed or dynamic (e.g., situationally dependent priority rankings). The processor 210 may be configured to determine which one of the wing angle requests generated by each control algorithm should have priority by resolving any conflicting requests or conducting priority determinations in real time. Multiple WARs may also be arbitrated additively, through subtraction, weighted or combined through any logical combination process. Thus, the processor 210 may have a speed and processing power sufficient to ensure that the status information 200 received via the vehicle communication bus 170 is both received and processed in real time (or near real time).

Output commands generated by the controller 140 in the form of a wing angle command (e.g., WAC in FIG. 2) may then be provided to the repositioning assembly 130. Although the repositioning assembly 130 may utilize hydraulics or other means by which to reposition (e.g., rotate or pivot) the active wing 120, the repositioning assembly 130 of some example embodiments may employ electronic controls. For example, the repositioning assembly 130 may include an electric motor 230 that may be used to reposition the active wing 120. In some cases, the electric motor 230 may be operably coupled to the active wing 120 via a gear box 240 to further enable the torque and speed of the repositioning of the active wing 120 to be controlled by the electric motor 230 with the response times and acceleration desired.

Various physical interfaces between the active wing 120 and the vehicle 110 may also be provided. For example, the active wing 120 may be pivotally attached to the vehicle 110 via one or multiple connection assemblies. The connection assemblies may include bell cranks, cams or other pivot structures that may be attached between the vehicle 110 and the active wing 120 so that, e.g., responsive to translational or rotational movement of a shaft powered via the electric motor 230 (and perhaps also the gear box 240), the active wing 120 can be pivoted relative to the vehicle 110 to define various different angles of attack for the active wing 120 relative to air flowing over the active wing 120. Whereas hydraulic components may be disposed inside the body of the vehicle 110, utilizing the electric motor 230 and gear assembly 240 of FIG. 2 may allow the entire repositioning assembly 130 to be external to the body of the vehicle 110 (e.g., attached only to rear body panels and/or a trunk panel of the vehicle 110). This structure may enable the active wing 120 and the repositioning assembly 130 to be easily added to an existing vehicle either at a modification center at an assembly plant, or as an after-market addition as a relatively easy to assemble sub-assembly. In some cases, although multiple connection assemblies may be provided with corresponding pivot structures, only one of the connection assemblies may have an instance of the electric motor 230 (and/or gear assembly 240) provided thereat to facilitate movement of the active wing 120 relative to the vehicle 110.

Figure 3:
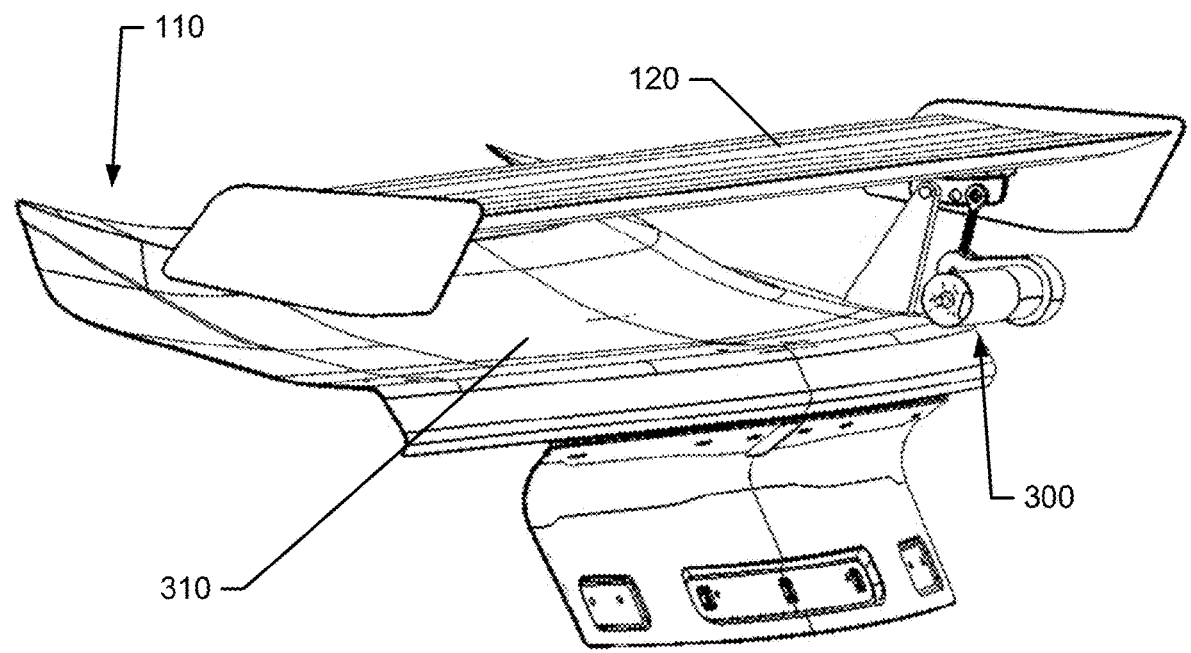
FIG. 3 illustrates a perspective view of some portions of the vehicle control system in accordance with an example embodiment.

FIG. 3 illustrates a rear perspective view of the vehicle 110 having the active wing 120 attached thereto via a pivot assembly 300, which forms part of the repositioning assembly 130 of FIGS. 1 and 2. As can be appreciated from the image shown in FIG. 3, the pivot assembly 300 is attached to sheet metal forming the body 310 of the vehicle 110, and a second instance of the pivot assembly 300 may be understood to exist (although not shown) on the rear left side of the vehicle 110 as well. Thus, each instance of the pivot assembly 300 may be attached external to the body 310 of the vehicle 110, and may be disposed to align the active wing 120 to have a longitudinal length that extends transversely across the rear of the vehicle 110 and substantially perpendicular to a longitudinal centerline of the vehicle 110. The fact that the pivot assembly 300 is attached externally means that the pivot assembly 300 (and therefore the active wing 120) can be added to an existing vehicle (or any number of different models of vehicles) without substantially altering the vehicle. Meanwhile, and to the contrary, inserting portions of the pivot assembly 300 inside the body 310 generally causes significant changes to vehicles and greatly limits the number and types of vehicles on which the active wing 120 can be used, and the cost of installation.

In some embodiments, over all positions or orientations of the active wing 120, the active wing 120 may maintain its position relative to the rear of the vehicle 110 and the only change its angle of attack relative to wind (e.g., apparent wind) passing over the active wing 120 at the rear area of the vehicle 110. Accordingly, the pivot assembly 300 may not translate the active wing 120 either laterally or longitudinally, but may instead only rotate the active wing 120 about an axis that extends substantially perpendicularly to the longitudinal axis of the vehicle 110. However, it should be appreciated that example embodiments could also be used to control other aerodynamic elements (e.g., louvers) or control an active wing located at portions of the vehicle 110 other than at the rear.

Figure 4:
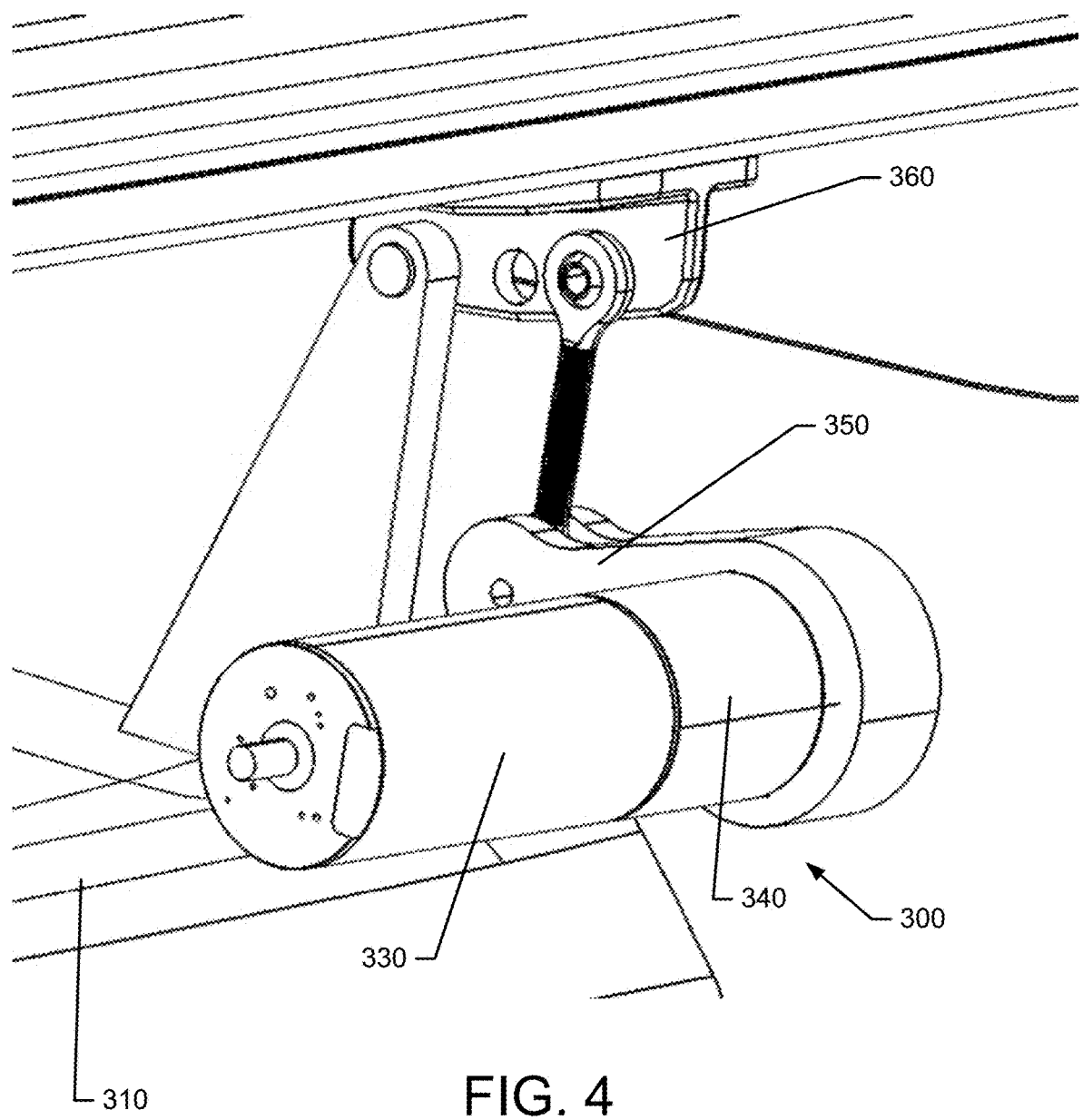
FIG. 4 illustrates a perspective of a pivot assembly in accordance with an example embodiment.

As shown in FIG. 4, the pivot assembly 300 may include a motor 330 (e.g., an example of electric motor 230). The motor 330 may be powered by local batteries, or may be powered via electrical connection to the power distribution system of the vehicle 110. The motor 330 may be operably coupled to a gear box 340 (e.g., an example of gear assembly 240). For example, an output shaft of the motor 330 may be connected to the gear box 340, and the gear box 340 may be configured to translate from the speed of the output shaft of the motor 330 to a desired speed for adjustment of the angle of attack of the active wing 120.

In an example embodiment, the gear box 340 may be operably coupled to a bell crank or a cam 350, which may in turn be operably coupled to a bracket 360 attached to an underside of the active wing 120. The movement of an output of the gear box 340 may correspondingly carry one end of the bell crank or cam 350 either forward or rearward, and the forward or rearward movement of that end of the bell crank or cam 350 may cause pivoting of the active wing 120 about an axis defined at or near the bracket 360. As noted above, one or multiple instances of the motor 330 may be included since the pivot assembly 300 may be duplicated on opposing sides of the vehicle 110. If multiple instances of the motor 330 are employed, then each of the motors 330 may be synchronized.

Figure 5A:
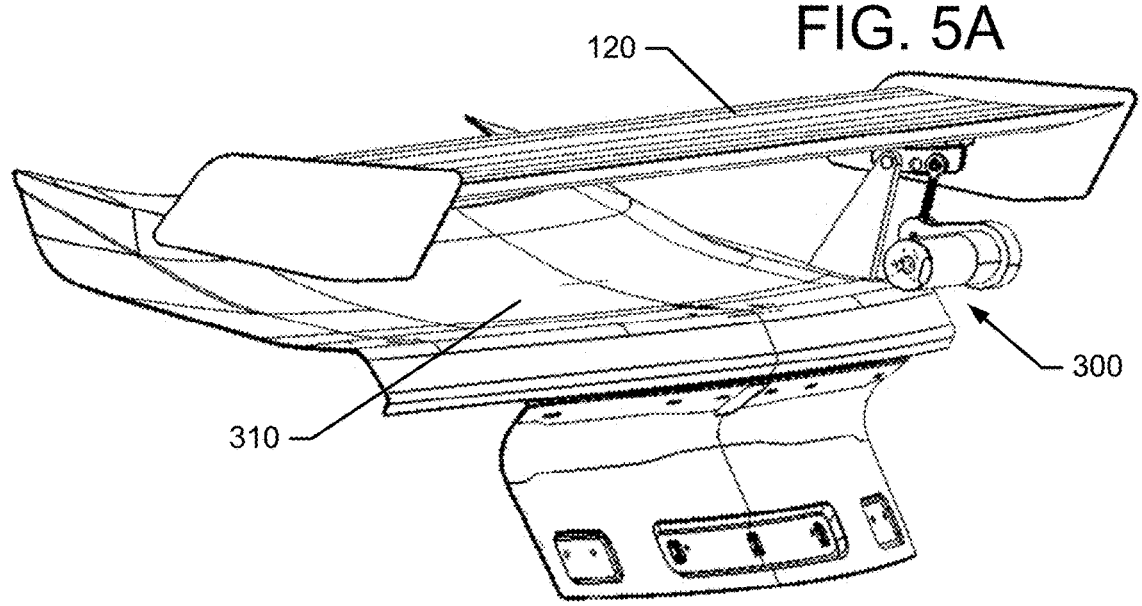
FIG. 5A is a perspective view of an active wing at a first (small angle of attack) in accordance with an example embodiment.
Figure 5B:
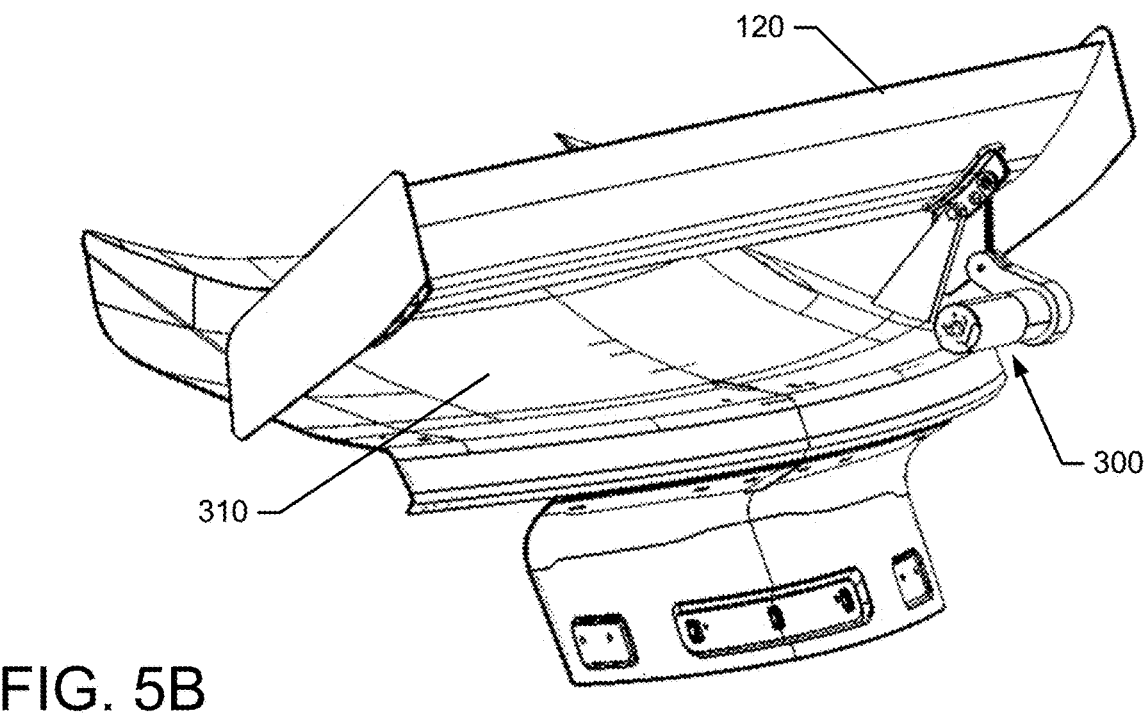
FIG. 5B is a perspective view of the active wing of FIG. 5A moved to a larger angle of attack in accordance with an example embodiment.

As noted above, the controller 140 may provide instructions to the repositioning assembly 130 for repositioning (i.e., changing the angle of attack) of the active wing 120 based on the status information 200. FIG. 5, which is defined by FIGS. 5A and 5B, illustrates the active wing 120 at two different angles of attack. In this regard, FIG. 5A shows the active wing 120 with a very small angle of attack, which would tend to minimize drag forces introduced by the active wing 120. Meanwhile, FIG. 5B shows the active wing 120 with a very large angle of attack, which could be expected to provide substantially greater drag. The repositioning assembly 130 may be configured to define a continuous range of selectable angles of attack between the angles shown in FIGS. 5A and 5B (and over the entire range of achievable angles of attack of the active wing 120). In other words, the angles of attack are not limited to a limited number of discrete positions, and can smoothly transition between relatively small (or large) changes in angle of attack on a continuing basis in response to instructions generated by the controller 140 based on the control algorithms executed by the controller 140.

In an example embodiment, one of the control algorithms that the controller 140 may be configured to execute may be a wing angle of attack monitoring algorithm. The wing angle of attack may be continuously monitored based on an input from the sensor network 160 responsive to monitoring any of a number of different possible components. In this regard, for example, the sensor network 160 may include a sensor configured to detect either a position of the active wing 120 or a position of some portion or component of the repositioning assembly 130 as a proxy for determining the position of the active wing 120. As one example, if the motor 330 is a servomotor, a position of the servo may be monitored and turned into a corresponding angle of attack value. Rotational rate of the servo and the active wing 120 may, for example, be derived from testing or modelling, and may vary based on specific aerodynamic characteristics of each type of vehicle or vehicle configuration. A relationship table or other mechanism by which to correlate servo position (or any other proxy that may be used) to angle of attack may be stored in the memory 220 for different vehicle types or configurations. Thus, inputs to the wing angle of attack monitoring algorithm may include information indicative of motor 330 or active wing 120 position, and outputs of the algorithm may include the wing angle of attack and rate of rotation of the active wing 120.

Another example of a control algorithm may include a wing deceleration algorithm. The wing deceleration algorithm may include two core strategies relating to modulated brake torque conditions and maximum braking that define deployment triggers for deploying the active wing to a position that provides maximum drag. Deceleration due to modulated brake torque may be achieved via a basic two dimensional table of vehicle speed versus requested wing angle (i.e., requested active wing 120 angle of attack). Maximum wing deceleration may be desired or triggered by monitoring whether brake torque and the rate of brake torque application are above their respective individually calibratable vehicle speed based thresholds. Alternatively, maximum wing deceleration may be triggered by monitoring whether an anti-lock brake system (ABS) event is detected via a comparison between requested brake torque and actual brake torque. If either of the conditions listed above are determined to be true (i.e., 1) brake torque and rate of brake torque application above threshold, or 2) comparing actual brake torque to requested brake torque indicates an ABS event), then the active wing 120 may be deployed to its maximum stall position (i.e., maximum angle of attack) in order to provide the corresponding maximum drag available. The repositioning of the active wing 120 to the maximum stall position may, in some cases, be performed at a high speed such as, for example, 280 to 325 msec. However, slower deployment is also possible in some embodiments. In effect, the wing deceleration algorithm monitors for conditions which suggest that maximum drag is desirable, so the active wing 120 can be deployed accordingly. The inputs are therefore the parameters discussed above, and the output is an instruction to quickly deploy the active wing 120 to the maximum stall position.

Another example of a control algorithm may be a wing velocity algorithm. The wing velocity algorithm may include two calibratable tables that may be stored in the memory 220 including a table of vehicle velocity versus wing angle and a table of vehicle velocity versus lateral G force. The wing velocity algorithm may monitor both vehicle velocity and filtered vehicular lateral G forces as inputs and, based on the tables, provide an output as a requested wing angle. The controller 140 may therefore monitor vehicle velocity and lateral G force to generate two (potentially different) suggested requested wing angles. The controller 140 may be configured to select the larger of the two suggested requested wing angles as the requested wing angle. Accordingly, the wing velocity algorithm effectively defines the base tables that are used for normal selection of the requested wing angle that is to be communicated to the repositioning assembly 130 in order to move the active wing 120 based on the requested wing angle.

Still another example of a control algorithm may be a wing yaw algorithm. The wing yaw algorithm may be configured to provide wing angle adjustments to improve stability based on vehicle yaw that is detected (e.g., by the controller 140 based on the status information 200). In this regard, for example, when the vehicle 110 is determined to have significant or unexpected yaw rate, or a greater than expected driver handwheel rate, incremental wing angle adjustments can be requested to provide additional stability to the vehicle 110 via increased rear wing angle provided by the active wing 120. The wing yaw algorithm may be executed in parallel with, and augment, operation of the wing velocity algorithm to provide incremental adjustments to the requested wing angles that otherwise result from the wing velocity algorithm. The wing yaw algorithm itself may include two primary tables (each of which may be configured to be calibrated over time). One of the tables may be a yaw error versus vehicle speed table, and the other may be a steering wheel angle rate versus vehicle speed table. Yaw error may be determined based on a yaw stability index value or based on calculations optimized for a given vehicle and/or situation. Meanwhile, steering wheel angle rate can be determined directly from the rate of change of steering wheel angle values provided by the sensor network 160. By entering each table with vehicle speed and either the yaw error or the steering wheel angle rate, respectively, two intermediate requested wing angles will result (i.e., one from each table). The maximum (or larger) requested wing angle from among the two intermediate requested wing angles will be output from the wing yaw algorithm as the requested wing angle. It should also be appreciated that other stability control-related data and/or models could be employed in connection with the wing yaw algorithm. For example, calculations could be made based on yaw rate, velocity, internal vehicle models, sensors related to the inertial state of the vehicle (Ax, Ay, Az etc), and other signals and calculations pertaining to vehicle stability familiar to one skilled in the art.

Another example of a control algorithm that the controller 140 may be configured to execute may include a traction available or stability torque error algorithm (or wing stability or traction enhancement algorithm). The wing stability or traction enhancement algorithm may employ two strategies including one when the vehicle 110 has traction or stability control (i.e., the Electronic stability control (ESC) system) enabled and another for when traction or stability control is disabled. When the ESC system is enabled for street driving or novice drivers, the wing stability algorithm may monitor the driver powertrain requested torque and the torque provided via the traction or stability control system of the vehicle 110. When there is a difference (e.g., powertrain torque is being limited), the system may request additional wing angle (i.e., an increase in the wing angle of attack) in order to increase the tractive effort or force available at the rear wheels of the vehicle 110 through additional downforce. When the traction or stability control system of the vehicle 110 is disabled, the wing stability or traction enhancement algorithm may be configured to monitor the individual corner wheel speeds and/or other parameters that may relate wheel speeds to throttle position and/or lateral G forces. An output of such monitoring may then be fed into a two dimensional table along with vehicle velocity, and the output is incremental to the base vehicle velocity versus wing angle output of the wing velocity algorithm. In other words, the output of the wing stability or traction enhancement algorithm modifies one of the values of the wing velocity algorithm (i.e., the vehicle velocity versus wing angle value).

Still another example of a control algorithm may include a drag reduction system (DRS) algorithm. The DRS algorithm is configured to minimize drag in order to maximize straight line speed of the vehicle 110. In other words, the DRS algorithm determines a wing angle that will provide minimum drag. In some cases, it may be desirable to enable the DRS algorithm or enter an operational mode in which the DRS algorithm is active (e.g., a DRS active mode) via a voluntary selection made by the driver. Thus, for example, a single dedicated button or selector may be used to select the activation of the DRS algorithm so that a request to move the wing to a position having the least drag can be provided. As an alternative to a dedicated button or selector, the DRS algorithm could be selected using a combination of other existing buttons. The DRS algorithm may include a table (e.g., a calibratable table) of vehicle velocity versus wing angles, where the table is set up for minimum drag at each respective velocity. With an input velocity, the corresponding output wing angle to minimize drag may be provided as the output or requested wing angle of the DRS algorithm. In some cases, the DRS algorithm may (e.g., due to being user selected) override other wing angle requests when the DRS algorithm is enabled (e.g., when in DRS active mode). Thus, it may be further desirable to deactivate the DRS mode automatically if certain conditions are detected. Deactivation of the DRS mode would return the controller 140 to normal operation (i.e., relative to the other control algorithms). Some of the conditions that may be detected as triggers to deactivate DRS mode may include exceeding a brake torque threshold, or a brake torque application rate threshold. Exceeding a threshold value for yaw angle or for steering wheel angle rate may also trigger deactivation of DRS mode. Applying brakes or potentially other triggers may also be used to automatically and immediately deactivate the DRS mode and return to normal operation.

As noted above, some or all of the control algorithms described above (and potentially others as well) may be executed in parallel and in real time by the controller 140. The execution of the control algorithms in parallel with each other may result in multiple potentially different requested wing angles. Accordingly, the controller 140 may be further configured to prioritize the control algorithms (either always or conditionally) to select which requested wing angle to fulfill at any given time. As one example, the DRS algorithm may have highest priority when in DRS active mode, and may be disabled completely when deactivated. Meanwhile, the wing angle of attack monitoring algorithm may continuously run in order to generate an indication of current wing angle. The wing stability or traction enhancement algorithm, since it modifies a portion of the wing velocity algorithm may effectively have priority (to perform the modification) over the wing velocity algorithm. The requested wing angles from each of the wing deceleration algorithm, the wing velocity algorithm, and the wing yaw algorithm may be prioritized based on system settings that can be changeable by the vehicle manufacturer, or by the user.

Example embodiments may therefore enable full control of the aerodynamic element or component (i.e., the active wing 120) for many different environments or situations thereby providing the ability to select enhanced operation for optimal drag, stability, etc. Example embodiments may also provide full yaw stability control via the wing yaw algorithm in order to provide yaw stability that can enhance driver confidence and vehicle capabilities. Example embodiments may also enable the user or manufacturers to have the ability to configure various aspects of the user experience by changing various parameters relating to chassis control, aerodynamic control, brake control, etc.

Figure 6:
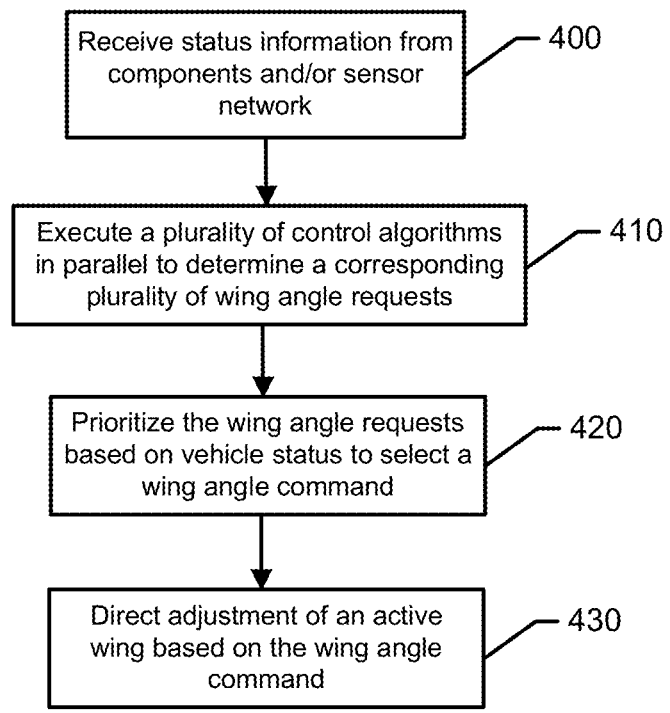
FIG. 6 illustrates a method of controlling vehicle stability in accordance with an example embodiment.

FIG. 6 illustrates a block diagram of one example control paradigm that may be executed by the controller 140 of an example embodiment. In this regard, as shown in FIG. 6, the controller 140 may be configured to receive status information from components and/or a sensor network of a vehicle at operation 400. A plurality of control algorithms may then be executed in parallel to determine a corresponding plurality of wing angle requests (e.g., one from each or at least some of the individual control algorithms) at operation 410. The controller 140 may then prioritize the wing angle requests based on vehicle status to select a wing angle command at operation 420. The controller 140 may also direct adjustment of the active wing 120 based on the wing angle command at operation 430.

Figure 7:
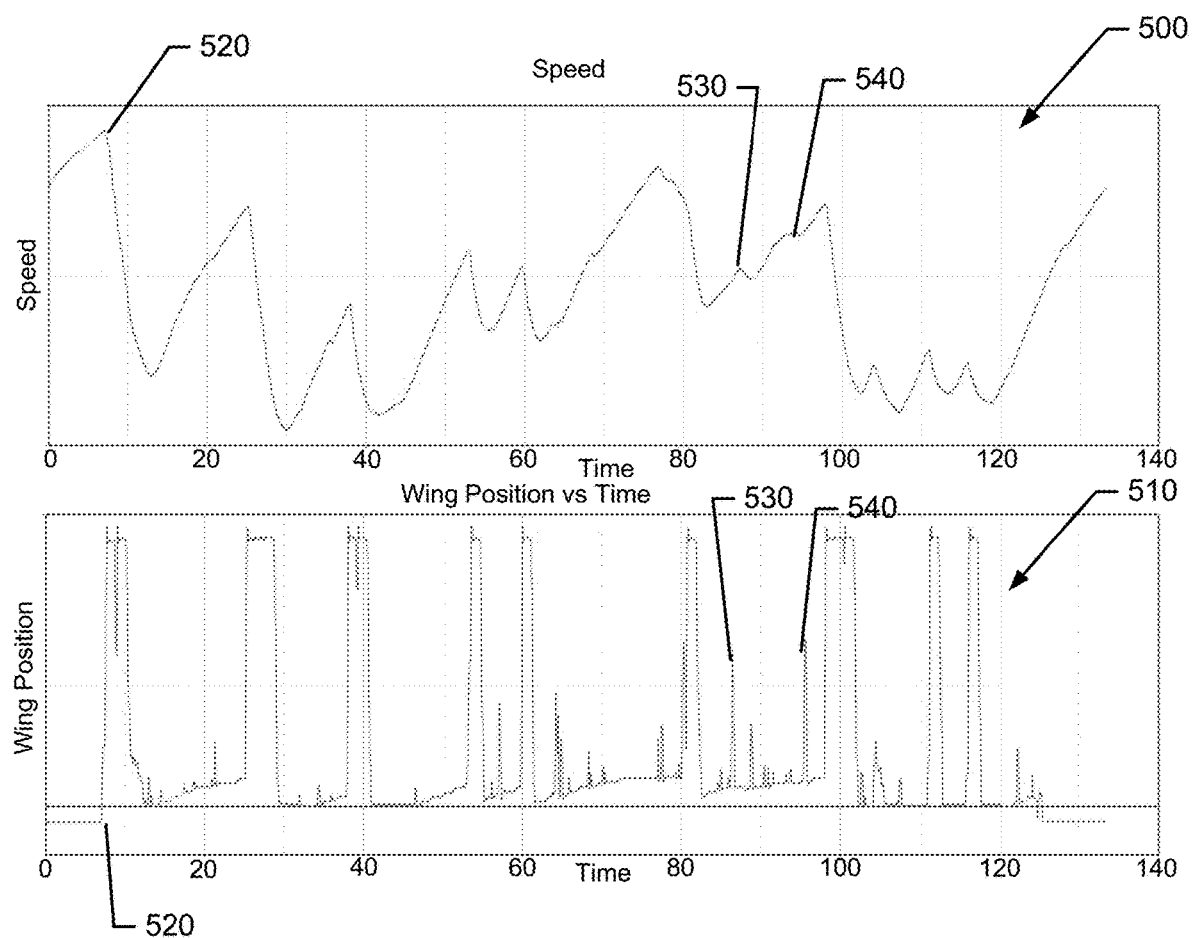
FIG. 7 illustrates graphs of vehicle speed verses time, wing position and versus time to illustrate operation of various control algorithms in accordance with an example embodiment.

FIGS. 7-9 illustrate charts associated with operation of the active wing 120 under various conditions. In this regard, FIG. 7 illustrates a graph 500 of vehicle speed verses time, and a corresponding graph 510 of wing position (e.g., angle of attack) versus time. For about the first six seconds of operation, speed is increasing and the DRS algorithm may control (e.g., due to being in DRS active mode) to minimize drag. Then at point 520, a brake event may occur, and the wing angle of attack can be seen to rapidly change accordingly. At points 530 and 540, yaw control events were triggered to initiate movement of the active wing 120 based on operation of the wing yaw algorithm. It should be appreciated that the duty cycle used in controlling and monitoring the active wing 120 may be modified relative to the data shown in these examples. Thus, these charts are merely illustrative of one example data set based on a given duty cycle.

FIG. 8 shows a graph 600 of vehicle speed versus time, a corresponding graph 610 of wing position (e.g., angle of attack) versus time, and a graph 620 of requested brake torque versus time. FIG. 8 also illustrates a number of points (e.g., points 630, 640 and 650) where brake initiations occur. Thus, the operation of the wing deceleration algorithm can be appreciated based on the repositioning of the active wing 120 responsive to the deployment triggers sensed at each respective one of points 630, 640 and 650.

FIG. 9 shows a graph 700 of vehicle speed versus time, a corresponding graph 710 of wing position (e.g., angle of attack) versus time, and a graph 720 of requested steering wheel angle (SWA) versus time. FIG. 9 also illustrates a number of points (e.g., points 730, 740 and 750) where counter-steer events occur. Thus, the operation of the wing yaw algorithm can be appreciated based on the repositioning of the active wing 120 responsive to the counter-steer events sensed at each respective one of points 730, 740 and 750. The wing yaw algorithm can be calibrated to speed and degree of oversteer.

A dynamic vehicle stability control system for a vehicle may therefore be provided. The system may include an active wing extending laterally relative to a longitudinal centerline of the vehicle and configured to be rotatable to change an angle of attack relative to wind passing over the vehicle parallel to the longitudinal centerline, a repositioning assembly operably coupling the active wing to the vehicle, and a controller operably coupled to components and/or a sensor network of the vehicle to receive status information about the vehicle. The repositioning assembly may be operated based on a wing angle command received by the controller responsive to execution of a plurality of control algorithms executed by the controller. The controller may be configured to determine the wing angle command based on respective wing angle requests generated by each of the control algorithms.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the controller may be further configured to prioritize the respective wing angle requests based on the status information. In an example embodiment, the repositioning assembly may include an electric motor and a gear box to enable selection of a plurality of continuous angle of attack positions between a maximum angle of attack and a minimum angle of attack for the active wing. In some cases, the repositioning assembly may be disposed entirely external to a body of the vehicle. In an example embodiment, the controller may be configured to determine the respective wing angle requests in parallel by determining one wing angle request from each of the control algorithms. In some cases, the plurality of control algorithms may include a wing angle monitoring algorithm configured to determine a current wing angle of attack on a continuous basis during operation of the vehicle. In an example embodiment, the plurality of control algorithms may further include a wing deceleration algorithm configured to detect a deployment trigger and, responsive to detecting the deployment trigger, deploy the active wing to a position that provides maximum drag. In some cases, detecting the deployment trigger may include determining that brake torque and rate of brake torque application are above threshold, or determining that a comparison of actual brake torque to requested brake torque indicates occurrence of an anti-lock brake system event. In an example embodiment, the plurality of control algorithms may further include a wing velocity algorithm configured to generate a first intermediate wing angle request based a first table defining a first suggested requested wing angle for vehicle velocity versus wing angle, and a second intermediate wing angle request based on a second table defining a second suggested requested wing angle for vehicle velocity versus lateral G force. The wing velocity algorithm may output an arbitrated value among (e.g., a larger one of) the first intermediate wing angle request or the second intermediate wing angle request. In some cases, the plurality of control algorithms may further include a wing stability or traction enhancement algorithm configured to compare requested torque to provided torque when vehicle traction or stability control is enabled to generate a first value in response to a difference between the requested torque and provided torque being above a threshold. The wing stability or traction enhancement algorithm may be further configured to monitor individual corner wheel speeds when vehicle stability control is not enabled and generate a second value, and the first value or the second value may be input into a third table to determine a modifier to an output of the wing velocity algorithm. In an example embodiment, the plurality of control algorithms may further include a wing yaw algorithm configured to generate one of the plurality of wing angle requests based on yaw rate or driver handwheel rate. In some cases, the wing yaw algorithm generates a first intermediate wing angle request based on yaw rate using a table of yaw error versus vehicle speed. The wing yaw algorithm may also generate a second intermediate wing angle request based on driver handwheel rate via a table of steering wheel angle rate versus vehicle speed. The wing yaw algorithm may also generate the one of the plurality of wing angle requests based on which of the first and second intermediate wing angle requests is largest. In an example embodiment, the plurality of control algorithms further include a drag reduction system algorithm configured to, responsive to a user request, employ a table of wing angles versus vehicle speed to define a wing angle providing a lowest drag for a given vehicle speed. While requested by the user, the drag reduction system algorithm may take priority over other control algorithms until an automated deactivation trigger is detected. In other words, the drag reduction system may only be usable with the driver interaction (e.g., momentary button press) and can be disabled after the driver stops pressing the button or the vehicle overrides due to other parameters (such as brake pedal depressions).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A dynamic vehicle stability control system for a vehicle, the system comprising:
    an active wing extending laterally relative to a longitudinal centerline of the vehicle and configured to be rotatable to change an angle of attack relative to wind passing over the vehicle parallel to the longitudinal centerline;
    a repositioning assembly operably coupling the active wing to the vehicle; and
    a controller operably coupled to components and/or a sensor network of the vehicle to receive status information about the vehicle,
    wherein the repositioning assembly is operated based on a wing angle command received by the controller responsive to execution of a plurality of control algorithms executed by the controller, the controller determining the wing angle command based on respective wing angle requests generated by each of the control algorithms;
    wherein the plurality of control algorithms further include a wing velocity algorithm configured to generate a first intermediate wing angle request based on a first table defining a first suggested requested wing angle for vehicle velocity versus wing angle, and a second intermediate wing angle request based on a second table defining a second suggested requested wing angle for vehicle velocity versus lateral G force, and wherein the wing velocity algorithm outputs an arbitrated value among the first intermediate wing angle request or the second intermediate wing angle request;
    wherein the plurality of control algorithms further include a wing traction enhancement algorithm configured to compare driver powertrain requested torque to provided torque when vehicle traction control is enabled to generate a first value in response to a difference between the driver powertrain requested torque and provided torque being above a threshold,
    wherein the wing traction enhancement algorithm is further configured to monitor individual corner wheel speeds when vehicle traction control is not enabled and generate a second value, and
    wherein the first value or the second value is input into a third table to determine a modifier to an output of the wing velocity algorithm.

2. The system of claim 1, wherein the repositioning assembly comprises an electric motor and a gear box to enable selection of a plurality of continuous angle of attack positions between a maximum angle of attack and a minimum angle of attack for the active wing.

3. The system of claim 2, wherein the repositioning assembly is disposed entirely external to a body of the vehicle.

4. The system of claim 1, wherein the controller is configured to determine the respective wing angle requests in parallel by determining one wing angle request from each of the control algorithms.

5. The system of claim 1, wherein the plurality of control algorithms comprises a wing angle monitoring algorithm configured to determine a current wing angle of attack on a continuous basis during operation of the vehicle.

6. The system of claim 5, wherein the plurality of control algorithms further includes a wing deceleration algorithm and a wing yaw algorithm,
  wherein the wing deceleration algorithm is configured to detect a deployment trigger and, responsive to detecting the deployment trigger, deploy the active wing to a position that provides maximum drag, and
  wherein the wing yaw algorithm is configured to generate one of the plurality of wing angle requests based on yaw rate or driver handwheel rate.

7. The system of claim 1, wherein the plurality of control algorithms further include a drag reduction system algorithm configured to, responsive to a user request, employ a fourth table of wing angles versus vehicle speed to define a wing angle providing a lower drag for a given vehicle speed, and
  wherein, while requested by the user, the drag reduction system algorithm takes priority over other control algorithms until an automated deactivation trigger is detected.

8. A method of providing vehicle stability control to a vehicle having an active wing disposed on the vehicle, the method comprising:
  receiving status information about the vehicle from components and/or a sensor network of the vehicle;
  executing a plurality of control algorithms in parallel to determine a corresponding plurality of wing angle requests;
  prioritizing the wing angle requests based on the status information about the vehicle to select a wing angle command; and
  directing adjustment of the active wing based on the wing angle command;
  wherein the plurality of control algorithms comprises a wing angle monitoring algorithm configured to determine a current wing angle of attack on a continuous basis during operation of the vehicle;
  wherein the plurality of control algorithms further include a wing velocity algorithm configured to generate a first intermediate wing angle request based a first table defining a first suggested requested wing angle for vehicle velocity versus wing angle, and a second intermediate wing angle request based on a second table defining a second suggested requested wing angle for vehicle velocity versus lateral G force, and wherein the wing velocity algorithm outputs an arbitrated value between the first intermediate wing angle request or the second intermediate wing angle request;
  wherein the plurality of control algorithms further include a wing stability algorithm configured to compare driver powertrain requested torque to provided torque when vehicle stability control is enabled to generate a first value in response to a difference between the driver powertrain requested torque and provided torque being above a threshold,
  wherein the wing stability algorithm is further configured to monitor individual corner wheel speeds when vehicle stability control is not enabled and generate a second value, and
  wherein the first value or the second value is input into a third table to determine a modifier to an output of the wing velocity algorithm.

9. The method of claim 8, wherein determining the corresponding plurality of wing angle requests comprises determining one wing angle request from each of the control algorithms.

10. The method of claim 8, wherein the plurality of control algorithms further include a wing deceleration algorithm configured to detect a deployment trigger and, responsive to detecting the deployment trigger, deploy the active wing to a position that provides increased drag.

11. The method of claim 10, wherein detecting the deployment trigger comprises determining that brake torque and rate of brake torque application are above threshold, or determining that a comparison of actual brake torque to requested brake torque indicates occurrence of an anti-lock brake system event.

12. The method of claim 8, wherein the plurality of control algorithms further include a wing yaw algorithm configured to generate one of the plurality of wing angle requests based on yaw rate or driver handwheel rate.

13. The method of claim 8, wherein the plurality of control algorithms further include a drag reduction system algorithm configured to, responsive to a user request, employ a table of wing angles versus vehicle speed to define a wing angle providing a lowest drag for a given vehicle speed, and
  wherein, while requested by the user, the drag reduction system algorithm takes priority over other control algorithms until an automated deactivation trigger is detected.

14. A method of providing vehicle stability control to a vehicle having an active wing disposed on the vehicle, the method comprising:
  receiving status information about the vehicle from components and/or a sensor network of the vehicle;
  executing a plurality of control algorithms in parallel to determine a corresponding plurality of wing angle requests;
  prioritizing the wing angle requests based on the status information about the vehicle to select a wing angle command; and
  directing adjustment of the active wing based on the wing angle command;
  wherein the plurality of control algorithms comprises a wing angle monitoring algorithm configured to determine a current wing angle of attack on a continuous basis during operation of the vehicle;
  wherein the plurality of control algorithms further include a wing yaw algorithm configured to generate one of the plurality of wing angle requests based on yaw rate or driver handwheel rate;
  wherein the wing yaw algorithm generates a first intermediate wing angle request based on yaw rate using a table of yaw error versus vehicle speed,
  wherein the wing yaw algorithm generates a second intermediate wing angle request based on driver handwheel rate via a table of steering wheel angle rate versus vehicle speed, and
  wherein the wing yaw algorithm generates the one of the plurality of wing angle requests based on arbitration of the first and second intermediate wing angle requests.

* * * * *